W. A. GRAVES.
COTTON STALK PULLER.
APPLICATION FILED DEC. 8, 1913.

1,146,762.

Patented July 13, 1915.
2 SHEETS—SHEET 1.

Witnesses

Inventor
W. A. Graves
By
Attorneys

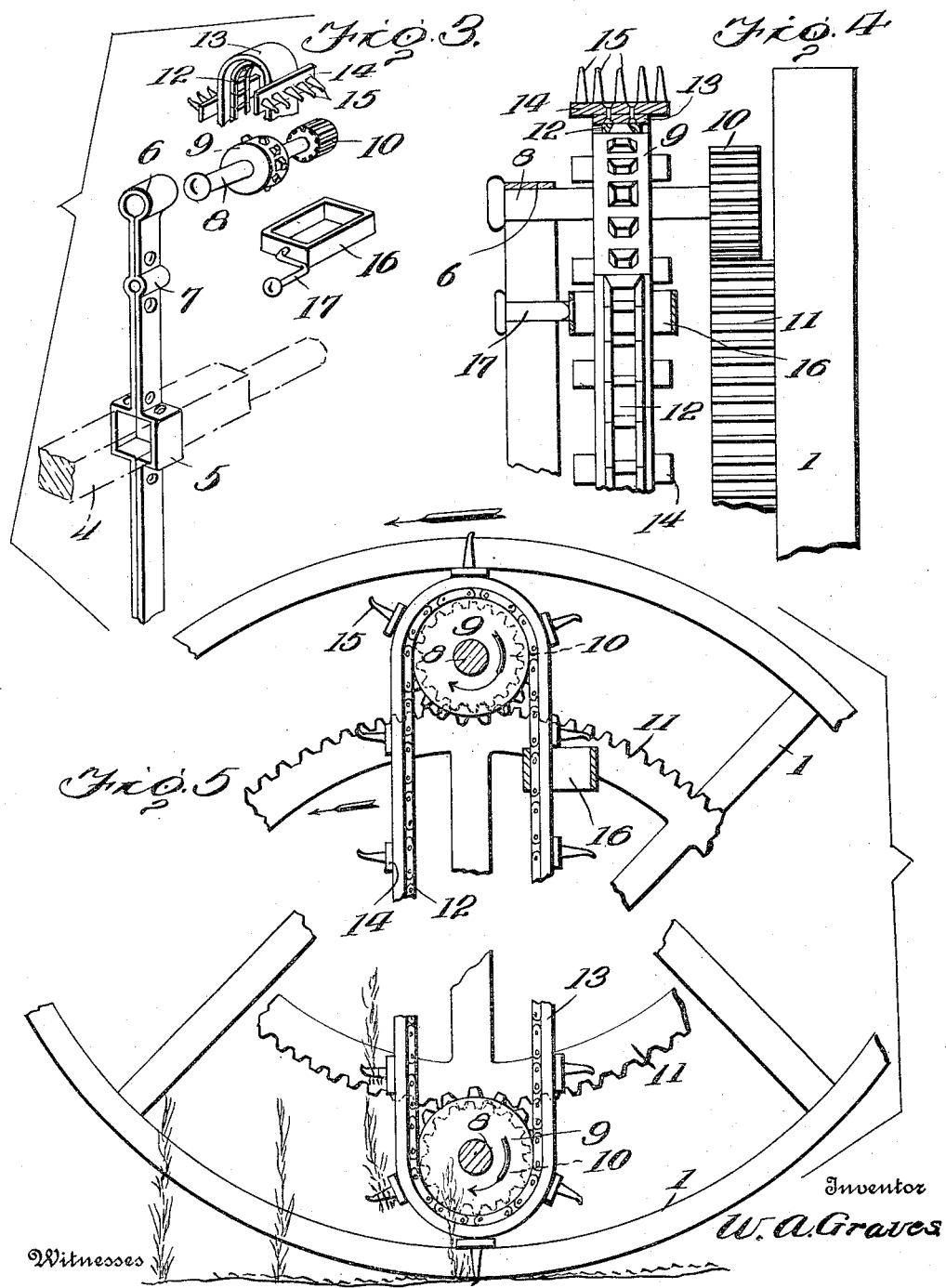

UNITED STATES PATENT OFFICE.

WILLIAM A. GRAVES, OF NORTH BIRMINGHAM, ALABAMA.

COTTON-STALK PULLER.

1,146,762.

Specification of Letters Patent.

Patented July 13, 1915.

Application filed December 8, 1913. Serial No. 805,399.

*To all whom it may concern:*

Be it known that I, WILLIAM A. GRAVES, citizen of the United States, residing at North Birmingham, in the county of Jefferson and State of Alabama, have invented certain new and useful Improvements in Cotton-Stalk Pullers, of which the following is a specification.

This invention relates to cotton stalk pullers, and has as its object to provide a machine for this purpose which may be driven through rows of cotton plants and will, as it advances, pull the plants and automatically deposit them in the rear of the machine.

It is one aim of the invention to so construct the pulling mechanism as to insure its proper engagement with the stalks below the lower branches in such manner that the stalks will be firmly gripped and their complete removal from the ground will be insured.

Another object of the invention is to so construct the pulling mechanism that it will be assisted in its operation by the forward movement of the machine as a whole so that a forward and upward pull will be exerted upon the stalks as they are engaged by the pulling fingers.

Figure 1:
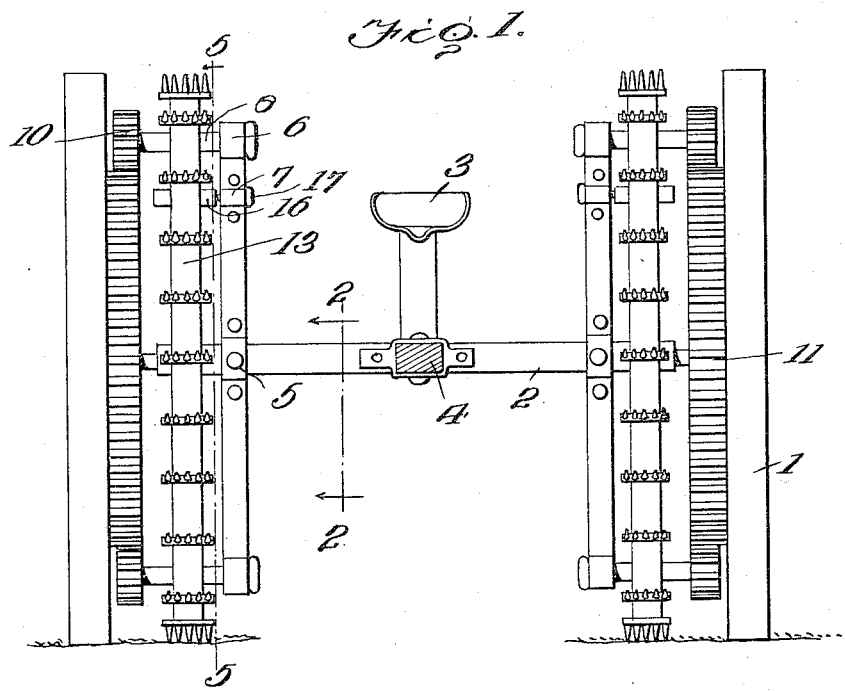
Figure 2:
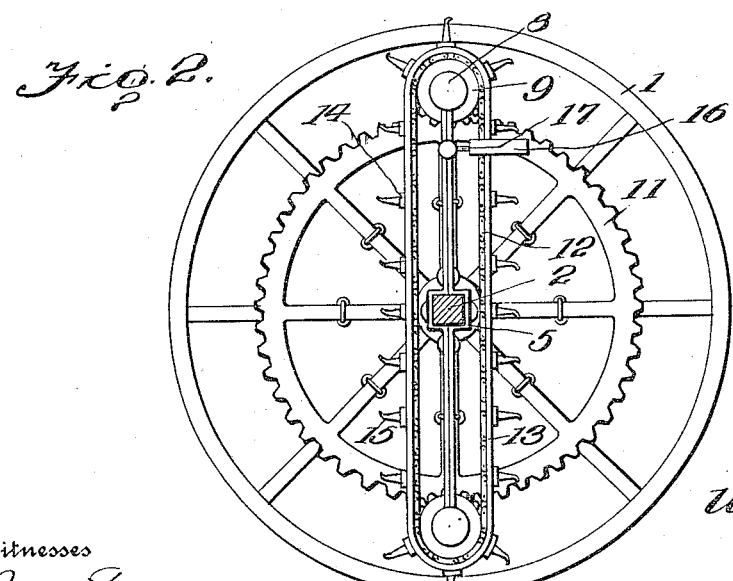

In the accompanying drawings, Figure 1 is a front elevation of the stalk pulling machine embodying the present invention. Fig. 2 is a vertical front to rear section on the line 2—2 of Fig. 1. Fig. 3 is a perspective view of a portion of the pulling mechanism, the parts being disassembled to more clearly illustrate their construction. Fig. 4 is a detail view partly in elevation and partly in section of the structure shown in Fig. 3. Fig. 5 is a section on the line 5—5 of Fig. 1, illustrating in detail the manner in which the stalks are engaged, pulled, lifted, and finally dislodged.

In the drawings the machine embodying the present invention is illustrated as supported for travel by ground wheels 1 mounted at the ends of a square axle 2 supporting a seat 3 and tongue 4.

The invention contemplates so constructing the machine that it will operate to pull two rows of stalks at a time and consequently one of the pulling mechanisms embodying the invention is located at each side of the middle of the axle 2 and inasmuch as they are of counterpart construction a description of one will suffice for both.

In supporting each pulling mechanism there is provided a frame which is preferably, though not necessarily, of bar metal and which is formed at an intermediate point with a box 5 which is fitted over and secured to the square portion of the axle 2 a suitable distance inwardly of the adjacent wheel 1.

Each frame includes portions which project above and below the box 5 and the ends of these portions are equidistantly spaced from the box 5 and each of the said ends of the frame is provided with a bearing 6. The projecting portions are further provided above or below the bearings 6, as the case may be, each with a sleeve 7 the purpose of which will be presently explained.

Mounted for rotation in each of the bearings 6 is a short shaft 8 upon which is fixed a sprocket gear 9 and fixed upon each of the shafts outwardly of the sprocket gear is a gear 10, these gears being located immediately inwardly of the wheels 1. Mounted in any suitable manner upon each of the wheels 1 is a gear 11 and by reference to Figs. 1, 2 and 5 of the drawings it will be observed that the gears 10 upon the shafts at the upper and lower ends of each frame mesh with the gear 11 upon the adjacent wheel, so that as the machine is drawn forwardly the shafts 8 will be rotated rearwardly in unison. A sprocket chain 12 secured to the inner side of an endless belt 13 is drawn over the sprocket gears 9 and it is upon this belt that the pulling devices of the mechanism are mounted.

Each of the pulling devices mentioned above is in the nature of a cross-piece 14 and these cross-pieces are secured at suitable intervals to the outer side of the belt 13 and extend transversely thereon, as clearly shown in Figs. 1 and 3. Each cross-piece carries a number of spaced fingers 15 which have their extremities curved in the manner shown in Figs. 3 and 5 of the drawings.

Referring now to Fig. 5 of the drawings it will be observed that as the machine is drawn forwardly the shafts 8 will be rotated rearwardly causing the forward stretch of the belt 13 to travel upwardly and its rear stretch to travel downwardly. As the belt passes about the lower sprocket gear 9 the fingers carried thereby will engage with the lower ends of the stalks as clearly shown in the said figure and as the fingers move successively upwardly due to the upward travel of the forward stretch of the belt the stalks engaged will be pulled. As the belt passes over the upper sprocket gear 9 the fingers will travel downwardly carrying with them the stalks which have been pulled, and in order that these stalks may be dislodged and deposited in rear of the machine the machine is provided with means which will now be described.

The dislodging device mentioned above consists essentially of an open frame 16 of such dimensions as to permit of the ready passage therethrough of the sprocket chain 12, belt 13 and the cross-pieces 14 and fingers 15. This frame is supported at the offset end of an arm 17 which is secured in the sleeve 7 in any suitable manner. It will now be apparent that as the sets of fingers pass downwardly through the frame 16 the stalks engaged thereby will strike against the sides of the frame, falling to the ground in rear of the machine.

It is preferable that a rake be mounted at the rear of the machine so as to gather the stalks as they are dropped but inasmuch as this constitues no part of the present invention it has not been shown.

Having described my invention, what I claim is:

1. In stalk pulling mechanism, a wheel supported axle, a gear carried by one of the wheels, a frame mounted upon the axle and having portions extending above and below the axle, a shaft journaled at the upper end of the frame, a shaft journaled at the lower end of the frame, a gear carried by each of the shafts and meshing with the gear upon the wheel, a sprocket upon each of the shafts, a sprocket chain trained about the sprockets, a belt carried by the chain for travel therewith, stalk-engaging fingers carried by the belt, and means upon the frame near the top and at the rear thereof coöperating with the rear stretch of the belt and the fingers thereon for dislodging stalks pulled and carried by the fingers.

2. In stalk pulling mechanism, a wheel supported axle angular in cross section, a frame member including frame bars secured together side by side and oppositely bent between their ends to form an angular collar embracing the said axle, the said frame bars at their upper and lower ends being bent to form bearings, stub-shafts journaled in the bearings, gears mounted upon the stub-shafts, a chain trained over the gears, spaced sets of pulling fingers carried by the chain, means for rotating one of the shafts, the frame member extending above and below the said axle, and means carried by the frame and having an open frame portion through which one stretch of the said chain travels, the said open frame portion comprising means for removing the pulled stalks from the said fingers.

3. In stalk pulling mechanism, an axle, wheels supporting the axle, a gear carried by one of the wheels, a frame rigidly connected with the axle and extending above and below the same, shafts mounted at the upper and lower ends of the frame, an endless belt driven from the shafts, stalk pulling devices carried by the belt, a gear carried by each of the said shafts and meshing with the gear of the wheel, and means carried by the frame and offset laterally and rearwardly from the upper portion thereof and located in the path of travel of the rear stretch of the belt for cleaning the said stalk pulling elements.

In testimony whereof I affix my signature in presence of two witnesses.

WILLIAM A. GRAVES. [L. S.]

Witnesses:
 WM. P. SAUNDERS,
 ARTHUR M. BROWN.